(12) United States Patent
Chakra et al.

(10) Patent No.: US 9,680,910 B2
(45) Date of Patent: Jun. 13, 2017

(54) STORING INFORMATION TO MANIPULATE FOCUS FOR A WEBPAGE

(71) Applicant: International Business Machines Corporation, Armonk, NY (US)

(72) Inventors: Al Chakra, Apex, NC (US); John A. Feller, Cary, NC (US); Trudy L. Hewitt, Cary, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 14/160,591

(22) Filed: Jan. 22, 2014

(65) Prior Publication Data

US 2015/0205808 A1 Jul. 23, 2015

(51) Int. Cl.
  *G06F 17/00* (2006.01)
  *H04L 29/08* (2006.01)
  *G06F 17/30* (2006.01)

(52) U.S. Cl.
  CPC .......... *H04L 67/02* (2013.01); *G06F 17/3089* (2013.01); *G06F 17/30896* (2013.01)

(58) Field of Classification Search
  CPC ........................... G06Q 30/02; G06F 17/2235
  USPC ........................................ 715/205, 234, 200
  See application file for complete search history.

(56) References Cited

U.S. PATENT DOCUMENTS

| | | | |
|---|---|---|---|
| 6,981,225 B1 | 12/2005 | Gaudette | |
| 7,386,802 B2 | 6/2008 | Gaudette | |
| 7,437,427 B1 * | 10/2008 | Veeraraghavan | ... G06F 17/3089 707/999.001 |
| 7,844,891 B2 | 11/2010 | Chandra | |
| 7,949,935 B2 | 5/2011 | Friedman et al. | |
| 7,971,149 B2 | 6/2011 | Hartmann | |
| 8,495,485 B2 | 7/2013 | Rundle | |
| 8,615,800 B2 | 12/2013 | Baddour et al. | |
| 2008/0162449 A1 * | 7/2008 | Chao-Yu | ................. G06F 21/51 |
| 2009/0063946 A1 | 3/2009 | Balasubramanian | |
| 2010/0332965 A1 | 12/2010 | Carraher et al. | |
| 2013/0132823 A1 * | 5/2013 | Sutic | ................. G06F 17/30896 715/234 |
| 2014/0143681 A1 | 5/2014 | Chandra | |
| 2016/0156694 A1 | 6/2016 | Chakra et al. | |

OTHER PUBLICATIONS

Diigo, "Diigo Extension for Chrome", © 2013 Diggo, Inc., printed on [Nov. 7, 2013], <https://www.diigo.com/tools/chrome_extension>.

IBM, "Generated URL", provided by inventors in main idea of disclosure, printed on [Nov. 7, 2013], <http://www.ibm.com?search-highlight=value>.

(Continued)

*Primary Examiner* — Manglesh M Patel
(74) *Attorney, Agent, or Firm* — Alexa L. Ashworth; Walter L. Rudberg (57) ABSTRACT

A method for storing a webpage configuration. The method includes determining a manipulated configuration of viewing properties and content of a webpage on a user interface. The method includes storing the manipulated configuration of viewing properties and content in data of the webpage. The method further includes generating a unique link to the webpage containing the stored manipulated configuration data.

20 Claims, 3 Drawing Sheets

(56) References Cited

OTHER PUBLICATIONS

IBM, "Original URL", provided by inventors in main idea of disclosure, printed on [Nov. 7, 2013], <http://www.ibm.com>.
Marker.to, "This is a yellow highlighter pen for webpages", provided by searcher IPpro Services (India) Pvt. Ltd. in search report dated Aug. 2, 2013, printed on [Nov. 7, 2013], <http://marker.to/>.
Webklipper, © 2010-2012, Webklipper Technologies Private Limited, provided by searcher IPpro Services (India) Pvt. Ltd. in search report dated Aug. 2, 2013, printed on [Nov. 7, 2013], <http://webklipper.com/webklipper>.
U.S. Appl. No. 15/016,459, filed Feb. 5, 2016, Entitled "Storing Information to Manipulate Focus for a Webpage".

\* cited by examiner

STORING INFORMATION TO MANIPULATE FOCUS FOR A WEBPAGE

FIELD OF THE INVENTION

The present invention relates generally to the field of sharing webpage content, and more particularly to storing information to manipulate focus for a webpage.

BACKGROUND

The Internet is a network of interconnected computers, allowing any computer connected to the network to send and receive information with any other computer connected to the network. The World Wide Web, or "web" environment is used to transfer data over the Internet. Servers and clients communicate information using hypertext transfer protocol (HTTP), the protocol for managing the transfer of various types of data in the web environment.

A web server is a server that functions to deliver webpages to clients, which can then be viewed using a web browser, a program that is able to display webpages from the Internet. To display a requested webpage, the web browser will make a request using HTTP, and the web server will respond, sending the content of the requested page.

Webpages are typically formatted through hypertext mark-up language (HTML), which can include images and text content. These webpages are connected to each other through hyperlinks, which allow for a connection to other web resources via a network. A uniform resource locator (URL) is a specific character string that constitutes a reference to a web resource, and is able to store information so it is accessible from any network connected computer. The information describing a webpage can be stored in metadata, which is structured information that describes, and makes it easier to retrieve, an information resource via a network. The content displayed on a webpage can be viewed using the web browser and reused in various ways, such as communicating the content to another user through sharing.

Once the contents of a webpage are shared with another user, the original user must indicate the significance of the webpage being displayed. One method of indicating a significant section of a webpage to another user is through the creation of anchors. Anchors are created when there is an alteration to a page, such as highlighting a portion of the text, and are used to direct a subsequent user to a page that displays the same alterations. Anchors can be stored as metadata within a URL, however, only a website author can determine what anchors can be stored when sharing a webpage.

SUMMARY

Embodiments of the present invention disclose a method, computer program product, and computer system for storing a webpage configuration. The method includes determining, by one or more computer processors, a manipulated configuration of viewing properties and content of a webpage on a user interface. The method includes storing, by one or more computer processors, the manipulated configuration of viewing properties and content in data of the webpage. The method further includes generating, by one or more computer processors, a unique link to the webpage containing the stored manipulated configuration data.

DETAILED DESCRIPTION

Figure 1:
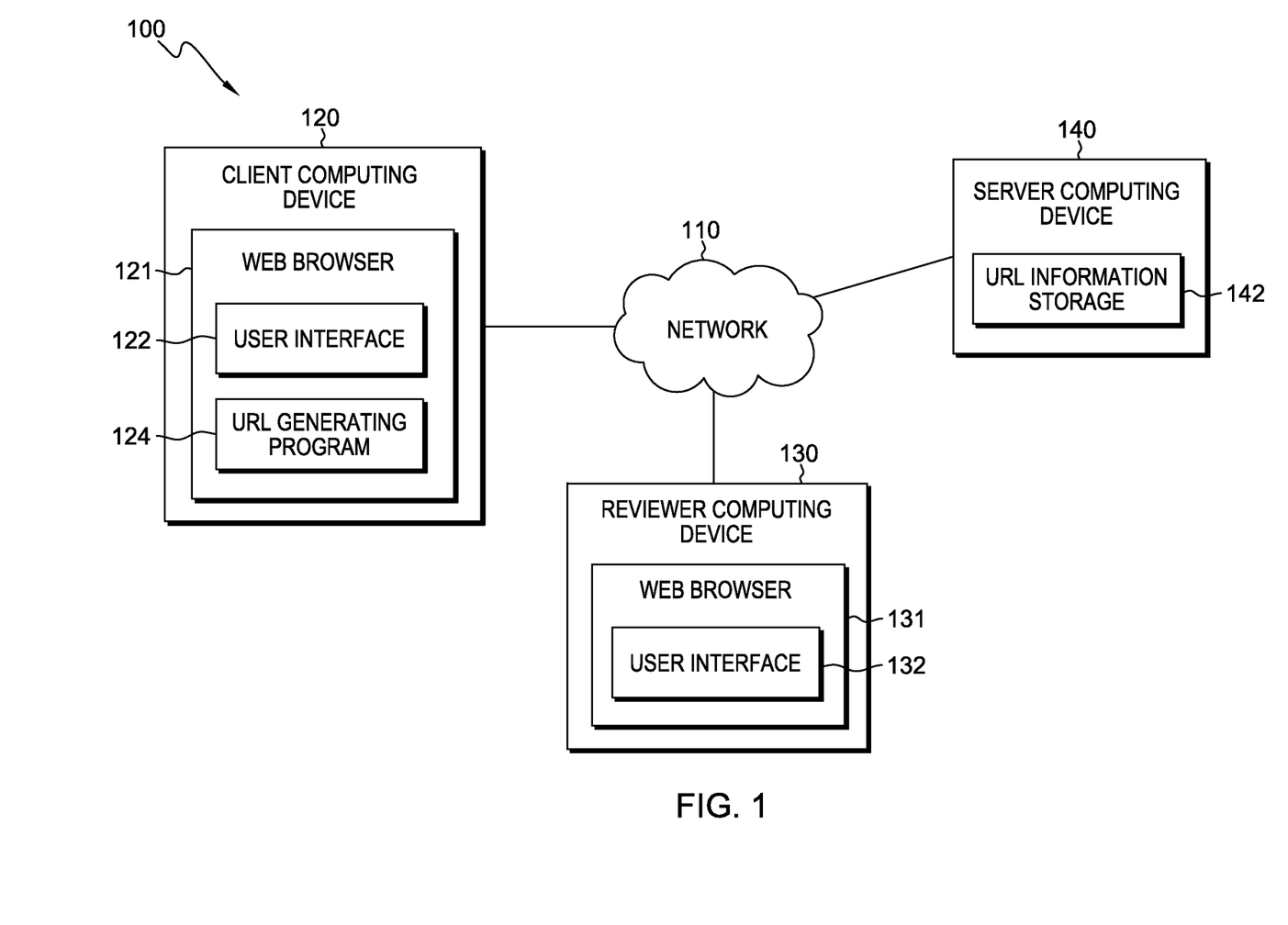
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 120, reviewer computing device 130 and server computing device 140, all interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communication between client computing device 120, reviewer computing device 130, and server computing device 140.

Client computing device 120 includes web browser 121, user interface (UI) 122 and URL generating program 124. In various embodiments of the present invention, client computing device 120 can be a laptop computer, a tablet computer, a netbook computer, a personal computer (PC), a desktop computer, a personal digital assistant (PDA), a smart phone, or any programmable electronic device capable of communicating with server computing device 140 via network 110. Web browser 121 is a software application capable of retrieving and presenting information obtained from the World Wide Web. In an exemplary embodiment of the present invention, a user operating client computing device 120 can view a webpage on web browser 121 and select viewing property variables, such as a zoom percentage. URL generating program 124 generates a unique URL which contains information on the viewing property variables, and when the unique URL is sent by the user via network 110, the URL and associated information can be stored on URL information storage 142 on server computing device 140. In various embodiments, web browser 121 may be an information retrieval system designed to provide access to information stored on a computer system or within a computing environment, for example, information stored on server computing device 140 in distributed data processing environment 100. UI 122 may be, for example, a graphical user interface (GUI) or a web user interface (WUI), and can display text, documents, web browser windows, user options, application interfaces, and instructions for operation. Client computing device 120 may include internal and external hardware components, as depicted and described in further detail with respect to FIG. 4.

URL generating program 124 creates a URL containing the information of modifications to the interface or behavior of web browser 121. URL generating program 124 can be implemented as an application, plug-in, service, or a built-in functionality of web browser 121. URL generating program 124 captures the properties of content on UI 122, configured by a primary user on client computing device 120, and determines changes to the webpage configuration by comparison to the original version of the webpage. URL generating program 124 can save the configuration settings in metadata, a layer of information that is only visible to the program, and create a unique URL using the metadata containing the information for the primary user's configuration settings, for example, modifications to the viewing property variables. The saved settings information is transmitted to server computing device 140, and stored on URL information storage 142, until it is retrieved by a second user. The webpage configured by the unique URL, containing the information for the primary user's configuration settings within the metadata, can be displayed on UI 132, through the web browser 131 of the reviewer computing device 130 via network 110, and viewed by a secondary user.

Reviewer computing device 130 includes web browser 131 and user interface (UI) 132. In various embodiments of the present invention, reviewer computing device 130 can be a laptop computer, a tablet computer, a netbook computer, a personal computer (PC), a desktop computer, a personal digital assistant (PDA), a smart phone, or any programmable electronic device capable of communicating with server computing device 140 via network 110. Web browser 131 is a software application capable of retrieving and presenting information obtained from the World Wide Web. In an exemplary embodiment of the present invention, a user operating reviewer computing device 130 can select a URL generated by URL generating program 124 on client computing device 120. Upon receiving the selection, web browser 131 can request, via network 110, information stored for the URL in URL information storage 142 on server computing device 140. The requested information can be displayed on UI 132 on reviewer computing device 130. UI 132 may be, for example, a graphical user interface (GUI) or a web user interface (WUI), and can display text, documents, web browser windows, user options, application interfaces, and instructions for operation.

Server computing device 140 includes URL information storage 142. Server computing device 140 may be a management server, a web server, or any other electronic device, or computing system capable of receiving and sending data. In other embodiments, server computing device 140 can be a laptop computer, a tablet computer, a netbook computer, a personal computer (PC), a desktop computer, a personal digital assistant (PDA), a smart phone, or any programmable electronic device capable of communicating with client computing device 120 and reviewer computing device 130 via network 110, and with various components and devices within distributed data processing environment 100. Server computing device 140 can store the files and data necessary to display a webpage on a computer via a web browser. Specifically, URL information storage 142 stores the URL and the variables created by URL generating program 124 until the information is requested by a subsequent user. In an embodiment of the present invention, the variables of a webpage are stored in the metadata of the new URL, and stored on URL information storage 142 of server computing device 140, until they are requested by a user. In an embodiment of the present invention, server computing device 140 can represent a computing system utilizing clustered computers and components to act as a single pool of seamless resources when accessed through a network. This is a common implementation for data centers and for cloud computing applications.

Figure 2:
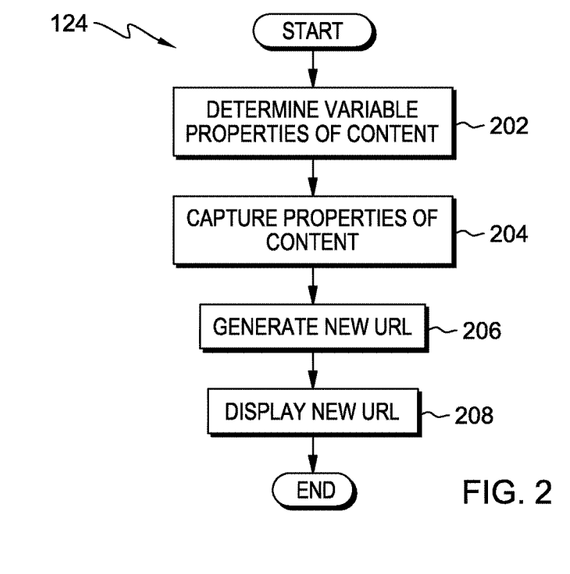
FIG. 2 is a flowchart depicting operational steps of a URL generating program for generating a unique URL that stores information about a configuration of a webpage, in accordance with an embodiment of the present invention.

FIG. 2 is a flowchart depicting operational steps of URL generating program 124 for generating a unique URL that stores information about the configuration of a webpage, in accordance with an embodiment of the present invention.

URL generating program 124 determines variable properties of content of a webpage (step 202). A user can select to use URL generating program 124 by invoking an outside service, such as the bitly URL shortening service, clicking on a downloaded application, or clicking on a built-in functionality of a web browser. URL generating program 124 determines the variable properties of the content on the webpage, configured and manipulated by a user, and displayed in UI 122, via a comparison to the content of the original webpage. Variable properties may include, for example, viewing properties such as web browser properties, such as lightbox and background properties, or changing the zoom on a portion of a webpage in UI 122, document properties, such as a highlighted portion of a webpage in UI 122, or changing the text size of the content in UI 122, or location on a page based on the paragraphs and scroll bar.

URL generating program 124 captures the properties of the content (step 204). URL generating program 124 may determine which features to capture by identifying a highlighted section or determining an area the user is hovering over and capturing that area. In one embodiment, URL generating program 124 determines, absent highlighting by the primary user, the section of a webpage the primary user is identifying based solely on what portion of the webpage is displayed on UI 122 when URL generating program 124 is selected. If a portion of the webpage is highlighted when URL generating program 124 starts, the highlighted selection will override URL generating program 124 identifying the relevant section of the page based on what portion of the webpage is displayed on UI 122 at the time URL generating program 124 is selected.

URL generating program 124 generates a new URL containing information based on the captured properties of a webpage (step 206). In an exemplary embodiment of the present invention, URL generating program 124 generates a unique URL containing the information for the variable properties of a webpage. The information contained in the unique URL could be a location on a page, browser settings, or an area identified by a user, among other information. In the exemplary embodiment, the determined variable properties of a webpage are stored in the metadata of the new URL, and stored on server computing device 140 until later access and retrieval by a subsequent user. In an alternate embodiment, a unique URL is created by a URL shortening service, such as bitly or TinyURL. The service can be invoked through a downloadable browser toolbar, an application, or opening the webpage that contains the service. The unique URL generated from URL generating program 124 may be substantially shortened in length through one of the URL shortening services, and directs the subsequent user to the webpage with the manipulated variable properties created by the primary user.

URL generating program 124 displays the new URL to the user (step 208). The new URL contains the stored manipulated configuration data of the webpage, and can be transmitted to users of another computing device via social media, copy and paste tools present in many software applications, e-mail, a chat room, an instant message, a bookmark tool used in many web browsers, or a document, such as a text document, a web document, or word processing documents, among other methods. In one embodiment, the metadata and URL associated with a webpage is stored on server computing device 140, and can be accessed and retrieved at a later time. In various embodiments, the original webpage may be altered by the content author, thus changing the variable properties of the selected webpage. URL generating program 124 can attempt to identify the most similar version of the page as the user selection by comparing words and images. This similar version can be stored on server computing device 140 until it is accessed by a user on reviewer computing device 130. If URL generating program 124 is able to identify a similar version of the webpage with high certainty, then URL generating program 124 retrieves the similar version of the webpage from server computing device 140 and displays the similar version of the webpage on UI 132. If URL generating program 124 is not able to identify a similar version with high certainty, accessing the new URL will bring the user to the existing, altered webpage, displayed without the captured variable properties.

Figure 3:
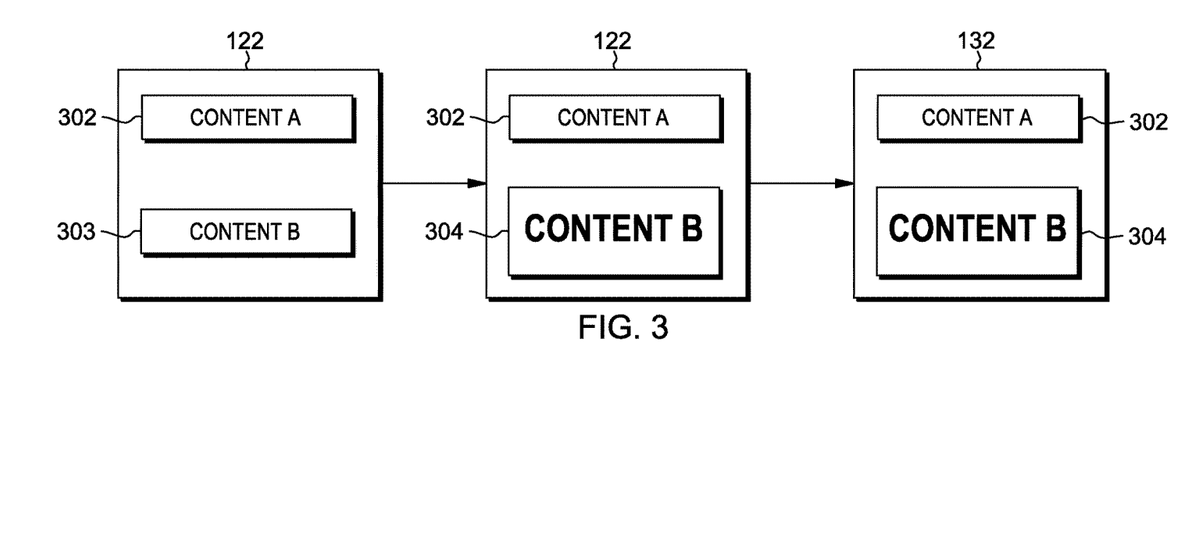
FIG. 3 illustrates an exemplary user interface displaying results from operation of the URL generating program of FIG. 2, in accordance with an embodiment of the present invention.

FIG. 3 depicts an exemplary user interface, such as UI 122 on client computing device 120 and UI 132 on reviewer computing device 130, displaying results from the operation of URL generating program 124, in accordance with an embodiment of the present invention.

In the exemplary embodiment depicted in FIG. 3, a primary user views the content of a webpage displayed on UI 122, which contains original content A 302 and original content B 303. A primary user may then configure and manipulate the content, including viewing property variables of the webpage displayed on UI 122, for example, content A 302 and manipulated content B 304. URL generating program 124 determines the configurations of the viewing property variables of UI 122 and generates a new URL containing the configured information. For example, content A 302 is not manipulated and manipulated content B 304 is zoomed in so that the text is larger. The primary user can transmit the generated new URL to a second computing device via, for example, email or social media.

As depicted on UI 132, the second user has selected the generated URL to view the contents of the webpage transmitted by the primary user. The second user will see the contents of the transmitted webpage as configured by the primary user on UI 122, for example, content A 302 and manipulated content B 304 on UI 132 appear the same as content A 302 and manipulated content B 304 on UI 122.

Figure 4:
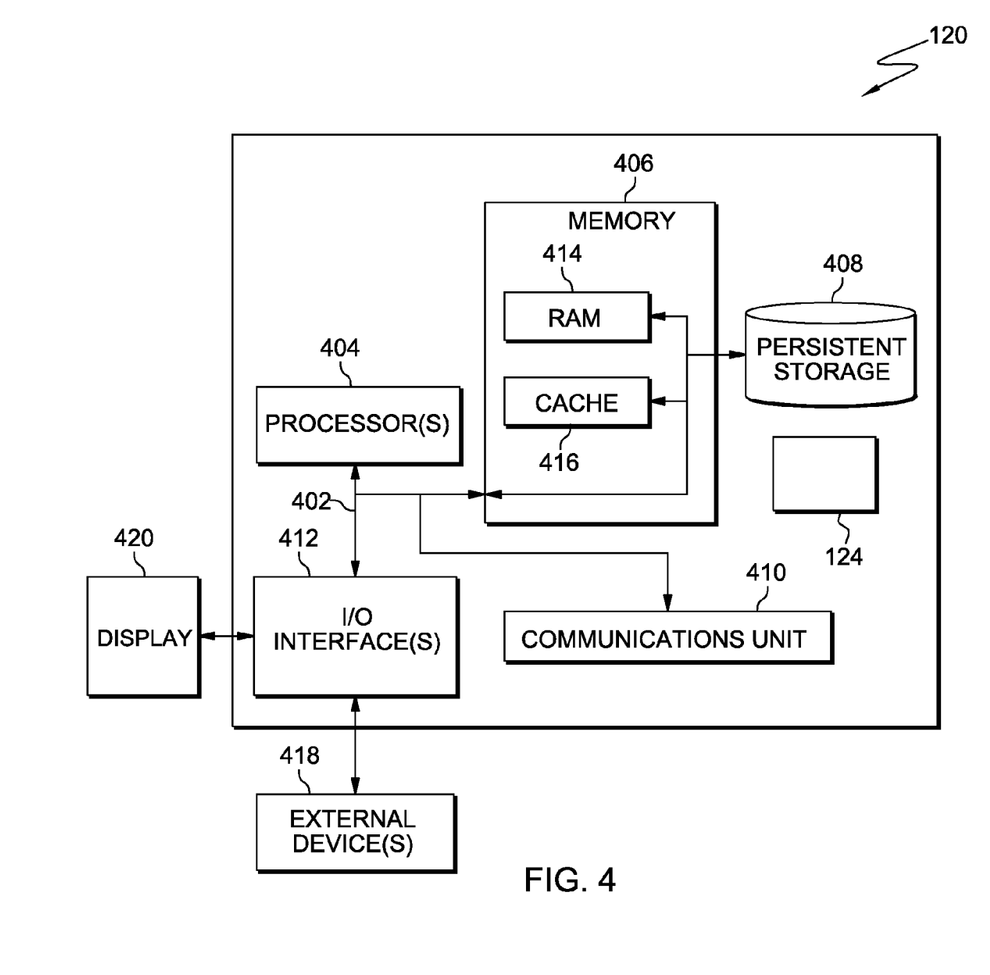
FIG. 4 depicts a block diagram of components of internal and external components of a data processing system, such as the client computing device of FIG. 1, in accordance with an embodiment of the present invention.

FIG. 4 depicts a block diagram of components of client computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

URL generating program 124 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including between client computing device 120, reviewer computing device 130, and server computing device 140. In these examples, communications unit 410 includes one or more network interface cards. Communications unit 410 may provide communications through the use of either or both physical and wireless communications links. URL generating program 124 may be downloaded to persistent storage 408 through communications unit 410.

I/O interface(s) 412 allows for input and output of data with other devices that may be connected to client computing device 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., URL generating program 124, can be stored on such portable computer-readable storage media and can be loaded onto persistent storage 408 via I/O interface(s) 412. I/O interface(s) 412 can also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for storing a webpage configuration, the method comprising:
   determining, by one or more computer processors, an alteration made to at least one property on a current webpage, wherein the alteration is to a viewing property and content on the current webpage, and wherein the current webpage is based on a first URL;

comparing, by one or more computer processors, an original webpage without alterations to the determined alterations made to the at least one property on the current webpage to determine variable properties of the content;

detecting, by one or more computer processors, whether a substantially similar version of the alteration, made to at least one property on the current webpage page, is stored within a URL information storage device;

responsive to detecting the substantially similar version of the alteration stored within the URL information storage device, retrieving and displaying, by one or more computer processors, a previously generated unique link associated with the substantially similar version of the alteration;

responsive to not detecting, a substantially similar version of the alteration made to at least one property on the current webpage, stored within the URL information storage device, storing, by one or more computer processors, the detected alteration made to the at least one property on the current webpage; and generating, by one or more computer processors, a unique link to reflect the current webpage containing the stored alteration made to at least one property.

2. The method of claim 1, further comprising:
transmitting, by one or more computer processors, either the previously generated unique link or the generated unique link to another computing device.

3. The method of claim 1, wherein storing the alteration made to the at least one property on the current webpage further comprises storing the alteration made to the at least one property as metadata in the URL.

4. The method of claim 1, wherein storing the alteration made to the at least one property on the current webpage further comprises storing the alteration made to the at least one property in a shortened URL.

5. The method of claim 1, wherein the determined alteration made to the viewing property comprises at least one of:
an alteration made to a browser property;
an alteration made to a browser setting;
an alteration made to a webpage configuration;
a generated lightbox;
an alteration made to a browser background property; or
an alteration made to a zoom setting on a portion of the current webpage.

6. The method of claim 1, wherein the determined alteration made to the content on the webpage comprises at least one of:
a highlighted portion of a webpage;
an addition of text to the current webpage;
an addition of a figure to the current webpage;
an alteration made to the size of text on the current webpage;
an alteration made to the size of image on the current webpage; or
convey a specific location of the current webpage.

7. The method of claim 1, further comprising:
responsive to storing the alteration made to the at least one property on the current webpage thereby comprising a previous alteration, detecting, by one or more processors, an update to the current webpage;
determining, by one or more processors, whether the update to the current webpage is similar to the previous alteration of the current webpage, wherein determining whether the update to the current webpage is similar to the previous alteration of the current webpage comprises:
comparing, by one or more processors, words and images of the previous alteration of the current webpage to the updated current webpage; and
identifying, by one or more processors, a level of similarity between the previous alteration of the current webpage to the updated current webpage, wherein the level of similarity is based on a predetermined level of certainty;

responsive to determining the update to the current webpage is similar to the previous alteration of the current webpage, storing, by one or more processors, the updated current webpage; and associating, by one or more processors, the generated unique link to the previous alteration of the current webpage with the stored updated current webpage.

8. A computer program product for storing a webpage configuration, the computer program product comprising:
one or more computer-readable storage media and program instructions stored on the one or more computer-readable storage media, the program instructions comprising:
program instructions to determine an alteration made to at least one property on a current webpage, wherein the alteration is to a viewing property and content on the current webpage, and wherein the current webpage is based on a first URL;
program instructions to compare an original webpage without alterations to the determined alterations made to the at least one property on the current webpage to determine variable properties of the content;
program instructions to detect whether a substantially similar version of the alteration, made to at least one property on the current webpage, is stored within a URL information storage device;
responsive to detecting the substantially similar version of the alteration stored within the URL information storage device, program instructions to retrieve and display a previously generated unique link associated with the substantially similar version of the alteration;
responsive to not detecting, a substantially similar version of the alteration made to at least one property on the current webpage, is stored within the URL information storage device program instructions to store the alteration made to the at least one property on the current webpage; and
program instructions to generate a unique link to reflect the current webpage containing the stored alteration made to at least one property.

9. The computer program product of claim 8, further comprising:
program instructions to transmit either the previously generated unique link or the generated unique link with to another computing device.

10. The computer program product of claim 8, wherein program instructions to store the alteration made to the at least one property on the current webpage further comprise program instructions to store the alteration made to the at least one property as metadata in the URL.

11. The computer program product of claim 8, wherein program instructions to store the alteration made to the at least one property on the current webpage further comprise program instructions to store the alteration made to the at least one property in a shortened URL.

12. The computer program product of claim 8, wherein the determined alteration made to the viewing property comprises at least one of:
   an alteration made to a browser property;
   an alteration made to a browser setting;
   an alteration made to a webpage configuration;
   a generated lightbox;
   an alteration made to a browser background property; or
   an alteration made to a zoom setting on a portion of the current webpage.

13. The computer program product of claim 8, wherein the determined alteration made to the content on the webpage comprises at least one of:
   a highlighted portion of a webpage;
   an addition of text to the current webpage;
   an addition of a figure to the current webpage;
   an alteration made to the size of text on the current webpage;
   an alteration made to the size of image on the current webpage; or
   convey a specific location of the current webpage.

14. The computer program product of claim 8, further comprises:
   responsive to storing the alteration made to the at least one property on the current webpage thereby comprising a previous alteration, program instructions to detect an update to the current webpage;
   program instructions to determine whether the update to the current webpage is similar to the previous alteration of the current webpage, wherein determining whether the update to the webpage is similar to the previous alteration of the current webpage comprises:
      program instructions to compare words and images of the previous alteration of the current webpage to the updated current webpage; and
      program instructions to identify a level of similarity between the previous alteration of the current webpage to the updated current webpage, wherein the level of similarity is based on a predetermined level of certainty;
   responsive to determining the update to the current webpage is similar to the previous alteration of the current webpage, program instructions to store the updated current webpage; and
   program instructions to associate the generated unique link to the previous alteration of the current webpage with the stored updated current webpage.

15. A computer system for storing a webpage configuration, the computer system comprising:
   one or more computer processors;
   one or more computer-readable storage media;
   program instructions stored on the one or more computer-readable storage media for execution by at least one of the one or more processors, the program instructions comprising:
   program instructions to determine an alteration made to at least one property on a current webpage, wherein the alteration is to a viewing property and content on the current webpage, and wherein the current webpage is based on a first URL;
   program instructions to compare an original webpage without alterations to the determined alterations made to the at least one property on the current webpage to determine variable properties of the content;
   program instructions to detect whether a substantially similar version of the alteration, made to at least one property on the current webpage, is stored within a URL information storage device;
   responsive to detecting the substantially similar version of the alteration stored within the URL information storage device, program instructions to retrieve and display a previously generated unique link associated with the substantially similar version of the alteration;
   responsive to not detecting, a substantially similar version of the alteration made to at least one property on the current webpage, is stored within the URL information storage device, program instructions to store the alteration made to the at least one property on the current webpage; and
   program instructions to generate a unique link to reflect the current webpage containing the stored alteration made to at least one property.

16. The computer system of claim 15, further comprising:
   program instructions to transmit either the previously generated unique link or the generated unique link to another computing device.

17. The computer system of claim 15, wherein program instructions to store the alteration made to the at least one property on the current webpage further comprise program instructions to store the alteration made to the at least one property as metadata in the URL.

18. The computer system of claim 15, wherein program instructions to store the alteration made to the at least one property on the current webpage further comprise program instructions to store the alteration made to the at least one property in a shortened URL.

19. The computer system of claim 15, wherein the determined alteration made to the viewing property comprises at least one of:
   an alteration made to a browser property;
   an alteration made to a browser setting;
   an alteration made to a webpage configuration;
   a generated lightbox;
   an alteration made to a browser background property; or
   an alteration made to a zoom setting on a portion of the current webpage.

20. The computer system of claim 15, further comprises:
   responsive to storing the alteration made to the at least one property on the current webpage thereby comprising a previous alteration, program instructions to detect an update to the current webpage;
   program instructions to determine whether the update to the current webpage is similar to the previous alteration of the current webpage, wherein determining whether the update to the current webpage is similar to the previous alteration of the current webpage comprises:
      program instructions to compare words and images of the previous alteration of the current webpage to the updated current webpage; and
      program instructions to identify a level of similarity between the previous alteration of the current webpage to the updated current webpage, wherein the level of similarity is based on a predetermined level of certainty;
   responsive to determining the update to the current webpage is similar to the previous alteration of the current webpage, program instructions to store the updated current webpage; and
   program instructions to associate the generated unique link to the previous alteration of the current webpage with the stored updated current webpage.

* * * * *